No. 661,097. Patented Nov. 6, 1900.
F. C. WINN.
TYPE WRITING MACHINE FOR WRITING MUSIC.
(Application filed Feb. 28, 1899.)
(No Model.) 6 Sheets—Sheet 1.

FIG.1.

WITNESSES:
Samuel T. Hobbes.
Elizabeth Gray.

INVENTOR
Frank C. Winn.
By Rufus B. Fowler
Attorney.

No. 661,097.  
F. C. WINN.  
TYPE WRITING MACHINE FOR WRITING MUSIC.  
(Application filed Feb. 28, 1899.)  
(No Model.) Patented Nov. 6, 1900.  
6 Sheets—Sheet 2.

Witnesses:  
Samuel T. Hobbs  
Henry W. Fowler

Inventor: Frank C. Winn.  
By Rufus B. Fowler  
Attorney.

No. 661,097. Patented Nov. 6, 1900.
F. C. WINN.
TYPE WRITING MACHINE FOR WRITING MUSIC.
(Application filed Feb. 28, 1899.)
(No Model.) 6 Sheets—Sheet 3.

No. 661,097. Patented Nov. 6, 1900.
F. C. WINN.
TYPE WRITING MACHINE FOR WRITING MUSIC.
(Application filed Feb. 28, 1899.)
(No Model.) 6 Sheets—Sheet 5.

Witnesses:
Samuel T. Hobbes.
Henry W. Fowler.

Inventor:
Frank C. Winn.
By Rufus B. Fowler
Attorney.

THE NORRIS PETERS CO., PHOTO-LITHO., WASHINGTON, D. C.

No. 661,097. Patented Nov. 6, 1900.
F. C. WINN.
TYPE WRITING MACHINE FOR WRITING MUSIC.
(Application filed Feb. 28, 1899.)
(No Model.) 6 Sheets—Sheet 6.

UNITED STATES PATENT OFFICE.

FRANK C. WINN, OF WORCESTER, MASSACHUSETTS.

TYPE-WRITING MACHINE FOR WRITING MUSIC.

SPECIFICATION forming part of Letters Patent No. 661,097, dated November 6, 1900.

Application filed February 28, 1899. Serial No. 707,191. (No model.)

*To all whom it may concern:*

Be it known that I, FRANK C. WINN, a citizen of the United States, residing at Worcester, in the county of Worcester and Commonwealth of Massachusetts, have invented a new and useful Improvement in Type-Writing Machines for Writing Music, of which the following is a specification, accompanied by drawings forming a part of the same, and in which—

Similar reference-figures refer to similar parts in the different views.

In the accompanying drawings I have represented a machine for writing music comprising mechanism by which the operation of printing musical characters is accomplished and also showing a mechanism for feeding the ink-ribbon and for vertically moving the ribbon-spools in order to interpose the ribbon between the paper and the type-forms; but the ribbon-actuating mechanism is not herein claimed, as it forms the subject of a separate application, filed on or about September 18, 1899, Serial No. 730,813, and forming a division of the present application.

Referring to the accompanying drawings, 2 denotes the base of the machine, forming a portion of the framework, upon the rear side of which a stationary upright frame 3 is mounted, provided with vertical ways 4 4 to receive a vertically-sliding frame 5. The vertically-sliding frame 5 is provided with horizontal ways 6 6 to receive a horizontally-sliding carriage 7, having brackets 8 and 8ª, in which are journaled the upper and lower paper-rolls 9 and 10, each provided with the milled knobs 11 and 12, by which they may be turned for the purpose of winding the paper from one roll to the other. The carriage 7 is provided with a plate 13, across which the paper 14 to be printed is drawn as it passes from one roll to the other, the plate 13 forming a platen to receive the blows of the type-forms 15, carried on the ends of the type-bars 16, which are pivoted upon a curved rod 17, supported by the posts 18, held in the base of the machine.

The stationary upright frame 3 carries a guide-plate 19, having a rectangular opening 20 in its center to receive the type-form and provided with inclined sides 21 21, by which the type-form is guided into the opening 20, thereby securing an accurate registration of each impression. The lower end of each type-bar is provided with a cam-shaped surface 22 and a projecting prong 23, inclosing a notch 24, between the prong 23 and the cam-surface 22, to receive the bent end 25 of the lever 26, which is pivoted at 27 in a post 28, held in the base of the machine. The opposite ends of the levers 26 have a pivotal connection with the vertically-sliding keys 29, held in the framework of the machine and provided with spiral springs 30, interposed between the ends of the lever 26 and the fixed framework, by which the weight of the keys and attached end of the levers are counterbalanced, nuts 31, carried on the lower ends of the keys, limiting the upward motion of the keys by their contact with the fixed framework of the machine.

By depressing one of the keys 29 its spiral spring 30 is compressed and its connected lever 26 rocked on its post 28, bringing the bent end 25 of the lever against the cam-surface 22 of the connected type-bar, causing it to swing on the curved rod 17 and carry its typeform against the platen. When the key is released, the motion of the key and its connected lever and type-bar is reversed by means of connected spring-actuated mechanism hereinafter described, causing the bent end 25 of the lever 26 to press against the projecting prong 23 and return the type-bar to its normal position. Pivoted upon posts 32 32, depending from the base of the machine, is a rocking frame 33 having arms 34, connected by links 35 with the rods 38, which extend downward from the frames 37, in which the ribbon-spools 38ª are supported. The rods 38 slide in fixed brackets 39, attached to the upright frame 3, and held in the brackets 39 are the upright posts 40, which form vertical guides for the spool-frames 37 and ribbon-spools 38ª.

Connected with the rocking frame 33 by posts 41 is a horizontal bar 42, which extends beneath the levers 26, so that the depression of any one of the levers will cause the frame 33 to be rocked and the ribbon-spools raised. The frame 33 is reversed by the action of a blade-spring 43, attached to the frame of the machine and bearing against a button 44, pivoted on the frame 33, thereby lifting the curved bar 42 and returning a depressed key and its connected type-bar to their normal position and at the same time lowering the ribbon-spools. The ribbon-spools 38ª carry an ink-ribbon 45, which passes around posts 46, which are held in spool-frames 37 to bring it in alinement with the platen 13, and by means of ribbon-feeding mechanism hereinafter described is alternately wound from one spool to the other in the operation of the machine.

Attached to the spool-frames 37, so as to be raised and lowered with them, is a shield-plate 47, which extends across the platen 13 and is interposed between the paper as it crosses the platen and the ink-ribbon 45. The shield-plate 47 is provided with a rectangular opening 47ª, which is brought behind the opening 20 of the guide-plate 19 when the shield-plate is raised in order to allow the ribbon to be carried into contact with the paper by the pressure of the type-form.

The heads of the ribbon-spools are provided with teeth, and the upper and lower heads alternately engage the inclined ribs 48 and 49 of the upper and lower pawls 50 and 51, which are pivoted on plates 52, attached to the upright frame 3.

Figure 8:
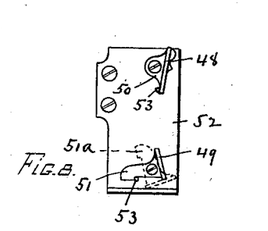
Fig. 8 is a detached view of the pivoted pawls by which a feeding motion is imparted to the ribbon-spools.
Figures 9, 10, 12:
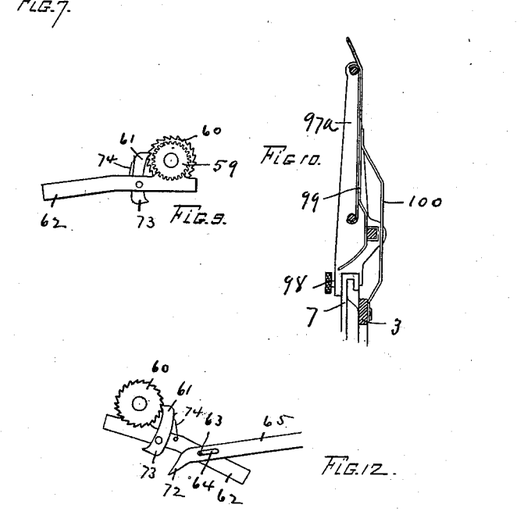
Fig. 9 is a detached view of a portion of the spacing mechanism by which a feeding motion is imparted to the carriage.
Fig. 10 is a vertical sectional view of the copy-holder or frame for holding music to be copied.
Figs. 11 and 12 represent portions of the spacing mechanism, or mechanism for imparting a feeding motion to the carriage, with the operating parts shown in different positions.
Figure 11:
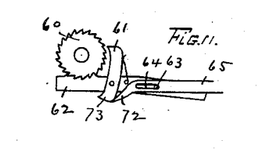
Figure 13:
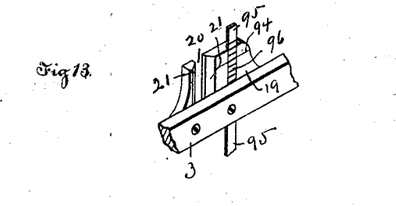
Fig. 13 is a perspective view of the guide-plate by which an accurate registration of the type-forms is secured.
Figure 14:
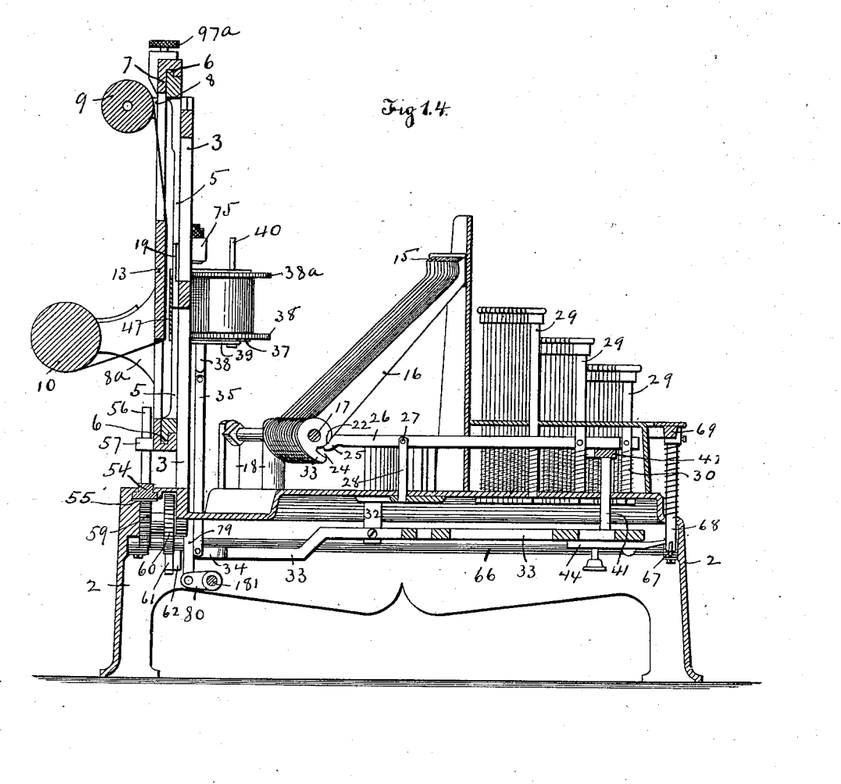
Fig. 14 is a vertical central sectional view of the machine.

Stop-pins 53, held in the plate 52, serve to limit the rocking movement of the pivoted pawls, which are weighted, so that they will rest in their normal position against a stop-pin. The upper pawls are arranged to rotate the spools as they move upward and to rock as the spools move downward, while the lower pawls are reversed, so they will continue the rotation of the spools as they move downward, but rock as the spools move upward. In order to impart a feeding motion to the ink-ribbon, one of the lower pawls is rocked to throw its inclined rib out of the path of the teeth on the spool-head, as shown by broken lines 51ª, Fig. 8, causing the opposite spool to wind up the ribbon as the spools move downward. As the spools are raised, however, the ribs of the upper pawls simultaneously engage the spools and turn them in opposite directions, causing the ink-ribbon as it is raised to its highest position to be drawn taut across the paper while it is being struck by a type-form.

When the ribbon has been entirely withdrawn from one of the spools, the motion of the ribbon is reversed, rewinding it upon the empty spool by returning the inoperative lower pawl into its operative position and rocking the opposite lower pawl into an inoperative position.

Sliding in ways on the rear side of the base 2 is a rack-bar 54, having teeth 55 on its underside. Projecting upwardly from the rack are two posts 56 56, which pass through lugs 57 on the horizontally-moving carriage 7, so that the sliding motion of the rack 54 in its ways will impart a horizontal movement to the carriage 7 and at the same time allow a vertical movement of the carriage 7 on the posts 56 56. Turning upon a stud 58, held in the base of the machine, is a pinion 59, engaging the rack-teeth 55, and attached to the pinion 59 is a ratchet-wheel 60, which is actuated by a pawl 61, carried by a swinging lever 62, which is pivoted concentrically with the ratchet-wheel 60. The swinging lever 62 carries a stud 63, which enters a slot 64 in the arm 65, which is attached to one end of a rocking shaft 66, which extends to the front side of the machine and carries at its opposite end a radial arm 67, having its free end extending beneath the lower end of a vertically-sliding stem 68, attached at its upper end to the spacing-key 69, which is a bent bar pivoted at its ends to the frame of the machine. A blade-spring 70, attached to the base of the machine, bears with its free end 71 against the under side of the slotted arm 65, rocking the shaft 66 and holding the arm 65 and the spacing-key 69 in their highest position. The end 72 of the slotted arm 65 when raised by the spring 70 is arranged to strike against the heel 73 of the pawl 61 and normally hold the pawl out of engagement with the ratchet 60, thereby disconnecting the ratchet from its actuating mechanism, so that the carriage 7 can be freely moved by hand horizontally in either direction. The depression of the spacing-key 69 rocks the shaft 66 and moves the slotted arm 65 and swinging lever 62 downward, allowing the pawl 61 to be carried into engagement with the ratchet 60 by means of a pawl-spring 74. The release of the spacing-key allows the blade-spring 70 to raise the slotted arm 65 and swinging lever 62, thereby causing the pawl 61 to turn the ratchet 60 and move the carriage 7 one space.

Pivoted upon the upright frame 3 is a shell or case 75, carrying a roller 76, provided with circumferential ribs 76ª, rotating in contact with an ink-roll 77, journaled in the shell 75. The pivoted shell 75 is normally held out of contact with the paper drawn over the platen 13 by means of a blade-spring 78; but it is capable of being pressed against the paper, so that a horizontal movement of the carriage 7 will cause the ribs of the roller 76 to rule the horizontal lines of the staff across the paper. The vertically-sliding frame 5, upon which the horizontally-moving carriage slides, is connected at its lower corners by links 79 with the radial arms 80 of a rocking shaft 81, journaled beneath the base 2. At one end of the rocking shaft 81 is a radial arm 82, connected by a link 83 with the lower end of a lever 84, pivoted at 85 and projecting through a slot 86 in the frame of the machine, with its upper end 87 arranged to be moved by the operator over the arc-shaped projection 88 of the frame, which is provided with three holes to receive a pin 89, carried by a blade-spring 90, which is pivoted to the arm 84, so that the pin 89 can be carried into a recess 91 on the lever and held permanently out of engagement with the holes in the frame.

The link 83 is made in two parts connected by a turnbuckle 83ª to allow the position of the carriage to be adjusted relatively to the lever 84, and the link 83 is connected with the base of the machine by a spiral spring 92 to counterbalance the weight of the carriage.

If printing is to be done upon a single staff, the carriage 7 is locked in its central vertical position by engaging the spring-latch with the central hole in the frame and ruling the staff across the paper by horizontally moving the carriage 7 by hand the width of the paper, with the ribbed roller 76 pressed against the paper. The pin 89 is then moved into the recess 91, and the lever 84 is moved by the operator to raise or lower the vertical frame 5, carrying the carriage 7, in order to determine the vertical position of the paper and to cause the characters to be printed upon the proper lines and spaces of the staff. In case three staves are to be used, one is ruled with the latch 84 engaging the central hole in the frame and the others are ruled with the latch engaging the holes 92ª and 93, the angular movement of the lever 84 giving sufficient amplitude of vertical movement to the carriage 7 to permit characters to be printed upon either of the three staves or above or below them.

The guide-plate 19 is provided with a horizontal gage-line 94 to indicate the line of printing, and the vertically-sliding frame carries a graduated blade 95, having lines 96 to indicate the lines of the staff and the upper and lower added or leger lines, said lines 96 being arranged to register with the line 94 when the corresponding lines of the staff are in proper position to be printed upon.

Attached to the carriage 7 are blades 97 97, which extend vertically across the platen 13 and are arranged to hold the edges of the paper against the platen. The blades 97 97 are attached to the carriage 7 by means of screws 97ª 97ª, which enter holes in the top of the carriage, and the blades are placed the proper distance apart to pass across the edges of the paper as it is stretched over the platen. A button 44 is pivoted to the rocking frame 33 and arranged when in one position to receive the pressure of the blade-spring 43, which reverses the motion of the rocking frame 33 when a key has been released. When it is desired to feed the carriage 7 independently of the spacing-key 69, the button 44 is turned one quarter-turn, bringing its end over the arm 67, so that the depression of any of the keys 29 will rock the shaft 66 and bring the pawl 61 into position to be raised by the spring 70 and feed the carriage 7 one space whenever the depressed key is released, while at the same time the spacing mechanism is free to be actuated by means of the spacing-key 69.

Figure 1:
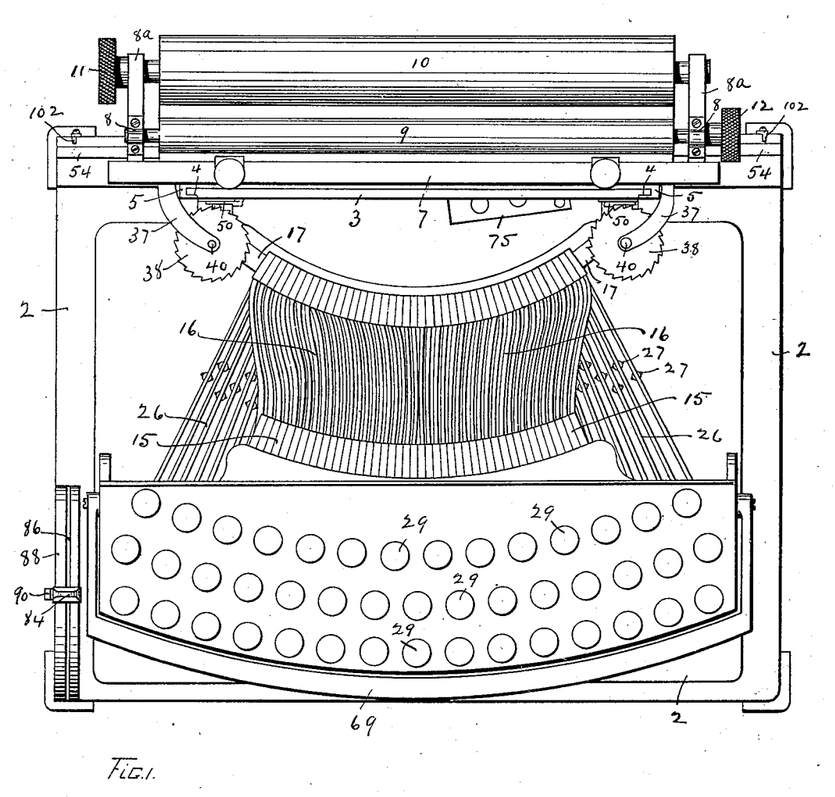
Figure 1 represents a top view of a machine for writing music embodying my invention.
Figure 2:
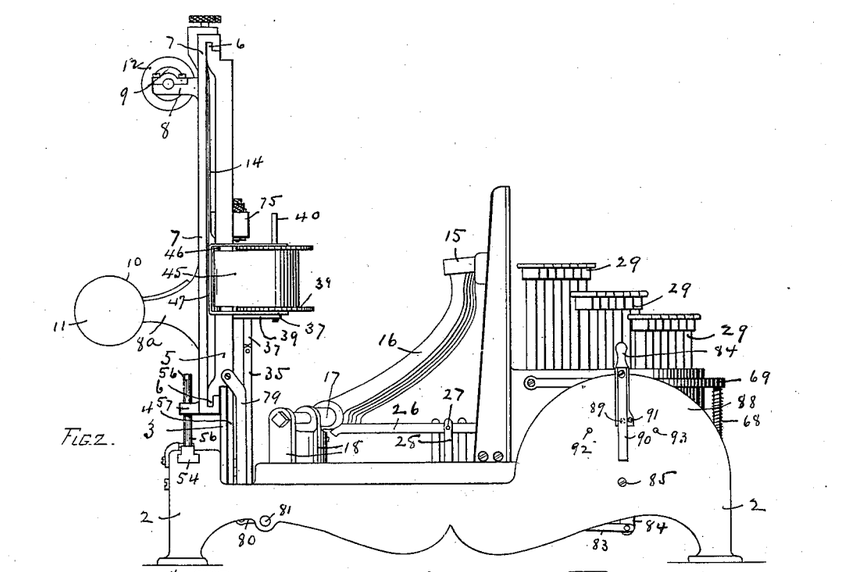
Fig. 2 is a side elevation.
Figure 3:
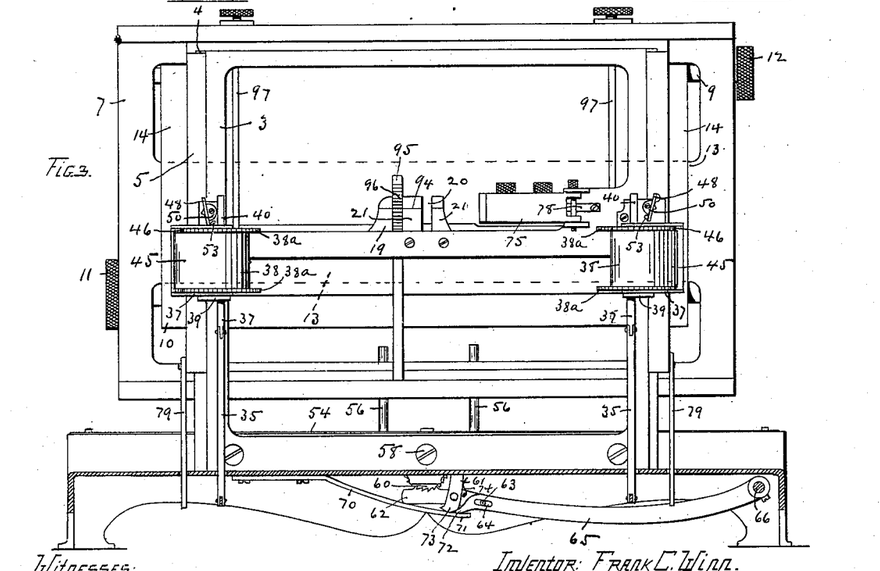
Fig. 3 is a front view of the upright frame supporting the paper-carriage and the ribbon-spools.
Figure 4:
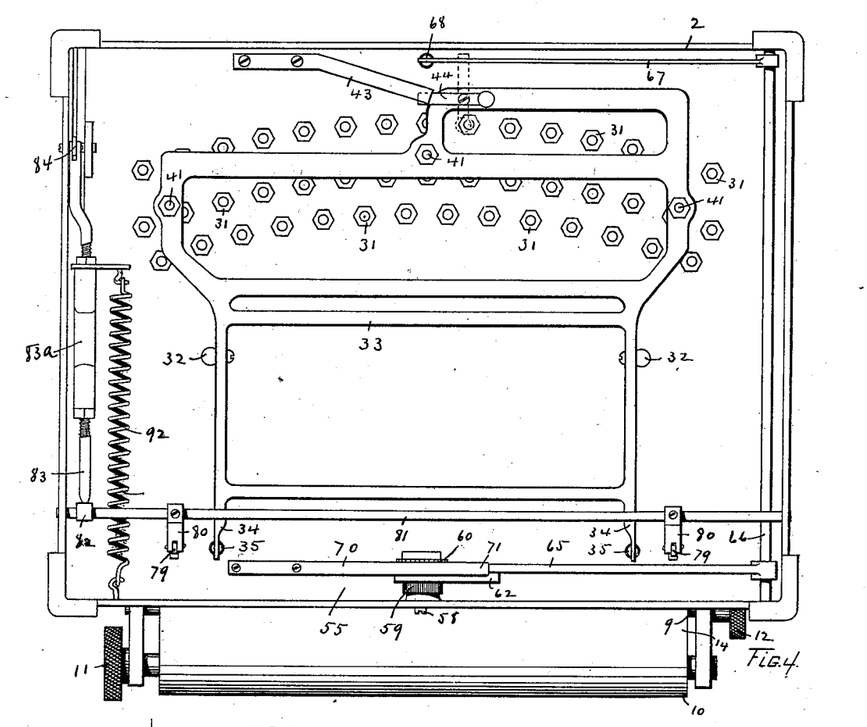
Fig. 4 is a bottom view.
Figure 5:
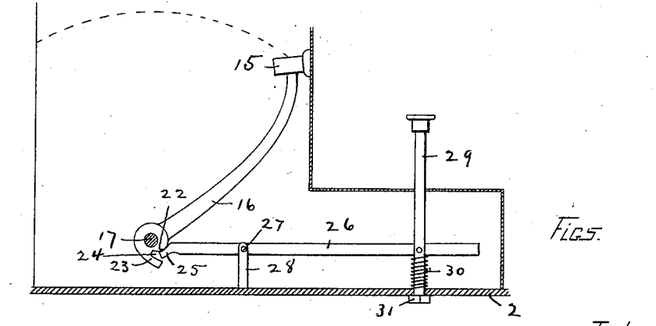
Fig. 5 is a diagrammatic view showing one of the type-bars and its actuating-lever key.
Figure 6:
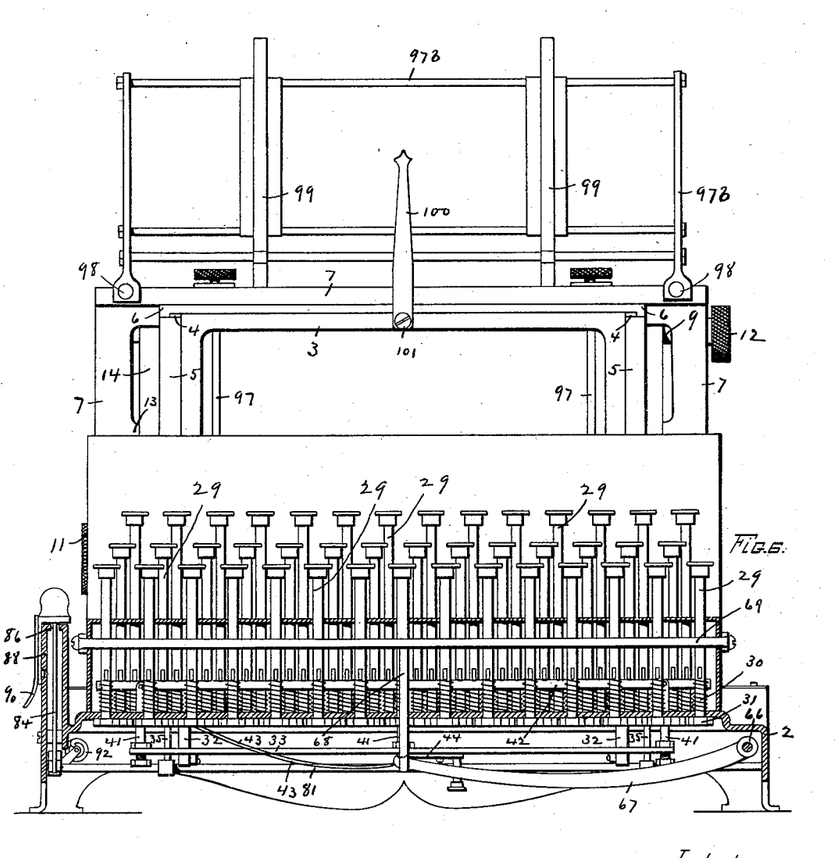
Fig. 6 is a front view of the machine with the copy-holder attached to the top of the paper-carriage and with a portion of the framework at the front of the machine removed to disclose the operating parts.
Figure 7:
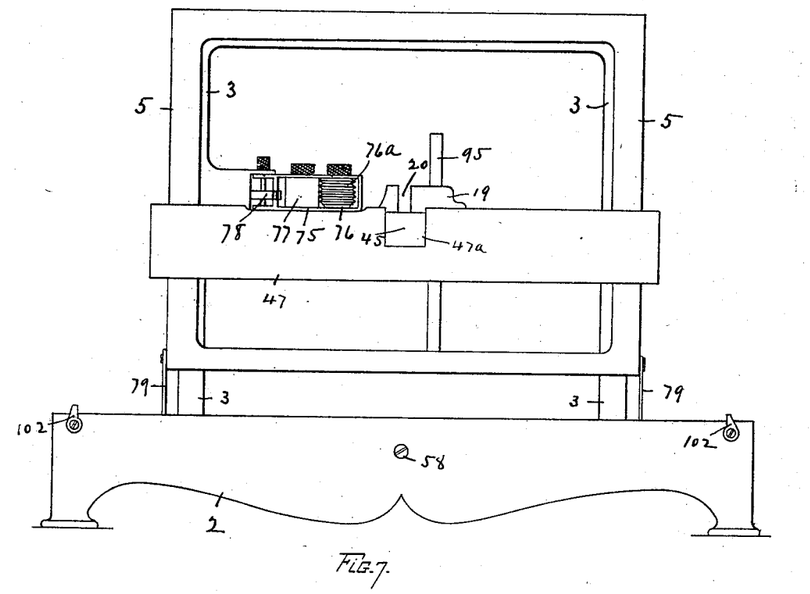
Fig. 7 is a rear view of the vertically-moving frame upon which the paper-carriage is supported, showing the rear side of the shield-plate and the mechanism for ruling a musical staff across the paper.

When music is to be copied, I attach to the top of the carriage 7 a supplemental frame or copy-holder 97ᵇ, detachably held on the carriage 7 by binding-screws 98 98 and shown in Fig. 6. The music to be copied is held in the copy-holder 97ᵇ by means of spring-blades 99 99, which press against the paper and hold it by frictional contact. A finger 100 is attached by a screw 101 to the fixed upright frame 3, with its upper end bearing against the copy. The music to be copied is placed in the copy-holder with its staff parallel with the line of motion of the carriage 7 and with the free end of the finger 100 at the center or third line of the staff, when the carriage 7 is held with the lever 84 held in its central position, in which the center line of the staff ruled by the roller 76 will correspond with the gage-line 94 or the line of the printing.

The operation of the machine is as follows: The paper is placed upon the roll 10 and drawn across the platen 13 behind the shield-plate 47. The lever 84 is locked in its upright or central position, and the staff is ruled by pressing the ribbed roller 76 against the paper on the platen and moving the carriage 7 horizontally. The lever 84 is then released and its latch-pin 89 held in the recess 91. The operator then varies the vertical position of the carriage 7 by means of the lever 84, so as to bring the proper line or space of the staff into the plane of printing, as indicated by the graduated blade 95 and the gage-line 94, when the proper key is depressed, thereby printing the desired character on the paper. The carriage 7 is then moved by the spacing-key, or the rocking frame 33 may be operatively connected with the spacing mechanism by turning the button 44 to bring its end over the end 67, so that the depression of the type-keys 29 will automatically feed the carriage 7. The printing is then continued by adjusting the carriage 7 vertically with one hand of the operator by means of the lever 84 and printing the characters by the keys 29. When the staff has been printed its entire length, the lever 84 is again locked in its central position and a new staff ruled across the paper and the printing continued. As each of the keys 29 are depressed and the type-forms carried against the paper the ink-ribbon and shield-plate are also raised in front of the platen, so that the ink-ribbon will receive the impact of the type-form, and as the key is released the shield-plate and ink-ribbon fall, disclosing the characters already printed upon the staff.

When music is copied as above described, the notes can be transposed above or below the key on which they are written by raising or lowering the copy held in the copy-holder. For example, the copy can be raised so that the free end of the finger 100 will point to the third space instead of the third line of the staff. When the lever 84 is held in its central position during the ruling of the staff, then all the notes will be printed one degree lower than on the music copied—that is, the note on the third space of the staff in the copy will be printed on the third line of the staff on the carriage 7, and so on.

As the carriage 7 is normally free from the spacing mechanism, I hold it from being accidentally withdrawn from its horizontal ways by means of a pair of stops 102 102, attached to the base 2 of the machine and extending into the path of a projection (not shown) on the rack-bar.

What I claim as my invention, and desire to secure by Letters Patent, is—

1. In a type-writing machine for writing music, the combination of a platen provided with a paper-supporting surface lying in the same plane and capable of a vertical and a horizontal movement parallel with the plane of its paper-supporting surface, paper-rolls 9 and 10 having parallel axes and journaled one above and the other below said platen, a series of type-forms arranged to strike said platen at a common printing-point and in the same horizontal plane, means for sliding said platen vertically so as to bring its entire surface into the horizontal plane of the printing and means for imparting a horizontal feeding movement to said platen, substantially as described.

2. In a type-writing machine, the combination of a platen provided with a flat or plane paper-supporting surface and capable of both a vertical and a horizontal movement in planes parallel with the plane of its paper-supporting surface, means for moving the paper transversely across the surface of said platen, a series of type-forms arranged to strike the platen at a common printing-point and in the same horizontal plane, means for sliding said platen vertically and means for imparting a horizontal feeding motion to said platen, substantially as described.

3. The combination with a framework having fixed horizontal ways for a sliding rack, a rack sliding in said ways, fixed vertical ways, a frame sliding on said fixed vertical ways and having horizontal ways for a paper-holding carriage, a paper-holding carriage sliding on said horizontal ways and operatively connected with said sliding rack, whereby said carriage is moved horizontally independently of its vertical movement, substantially as described.

4. The combination of a fixed upright frame having vertical ways, a frame capable of sliding on said ways and having horizontal ways, a carriage sliding on said horizontal ways, lugs projecting from said carriage, a horizontally-sliding rack, means for imparting a feeding motion to said rack, and posts projecting upwardly from said rack and entering holes in said carriage-lugs, whereby the feeding motion of said rack is imparted to said carriage independently of its vertical movement, substantially as described.

5. The combination of a paper-holding carriage, capable of sliding in the horizontal ways of a vertically-sliding frame, a frame sliding in vertical fixed ways, a rack sliding in fixed horizontal ways and operatively connected with said carriage, a pivoted lever operatively connected with said vertically-sliding frame by which said frame is raised and lowered, a platen held by said carriage and consisting of a flat plate lying in a plane parallel with the line of the vertical movement of said carriage and a series of type-forms arranged to strike said plane in a single horizontal plane, substantially as described.

6. The combination with a sliding rack and paper-holding carriage operatively connected with said rack, of a pinion engaging said rack, a ratchet attached to said pinion, a swinging lever pivoted concentrically with the axis of said ratchet, a pawl carried by said swinging lever and engaging said ratchet, a stud carried by said swinging lever and engaging a slotted arm, a slotted arm attached to a rocking shaft, means for rocking said shaft, a spring bearing against said slotted arm to raise said slotted arm into contact with said pawl, whereby said pawl is normally held out of engagement with said ratchet, substantially as described.

7. The combination with a paper-holding carriage and a sliding rack operatively connected therewith, of mechanism for intermittently moving said rack, comprising a pawl and ratchet, a rocking shaft operatively connected with a spacing-key, a spacing-key, a radial arm carried by said rocking shaft and arranged to engage said pawl, said radial arm having an extended tip adapted to strike said pawl and disengage it from said ratchet, substantially as described.

8. The combination of a sliding rack, a pinion engaging said rack, a pawl-and-ratchet mechanism operatively connected with said pinion, a rocking shaft operatively connected with a spacing-key, a spacing-key by which said shaft is rocked in one direction, a spring by which the rocking shaft is reversed, a radial arm carried by said rocking shaft and having its end held by said spring against said pawl to normally hold it out of engagement with said ratchet and intermediate connecting mechanism between said radial-arm and said pawl, whereby the pawl is moved into engagement with said ratchet, substantially as described.

9. The combination of a rack, a pinion engaging said rack, a ratchet attached to said pinion, a swinging lever pivoted concentrically with said ratchet, a pawl pivoted on said lever, a spring by which said pawl is carried into engagement with said ratchet, a rocking shaft, an arm operatively connected with said swinging lever to rock the same and having its end arranged to come into contact with said pawl and disengage it from said ratchet, a spacing-key by which said shaft is rocked in one direction and a spring by which its motion is reversed, substantially as descrbed.

10. The combination of a vertically-sliding frame provided with horizontal ways for a paper-holding carriage, a paper-holding carriage sliding in said horizontal ways, a rocking shaft, radial arms carried by said shaft, links connecting said arms with said vertically-moving frame, a pivoted hand-lever operatively connected with said rocking shaft, a plate having an edge shaped in the arc of a circle and concentric with the pivot of said hand-lever and provided with holes to receive a spring-latch and a spring-latch carried by said hand-lever, whereby said frame is locked in position, a platen carried by said carriage consisting of a bar, or plate, having a paper-supporting surface lying in a plane parallel with the vertical movement of said frame and a series of type-forms arranged to strike said platen in the same horizontal plane, substantially as described.

11. The combination of a platen presenting a flat surface for the support of the paper to be printed, a ruling mechanism having a series of contact-points with the paper on said platen, means for moving the platen in one direction to simultaneously rule a series of lines forming a musical staff, means for moving the platen at right angles to the ruled lines to bring a new portion of the paper into contact with the ruling mechanism, substantially as described.

12. The combination with a carriage capable of both a horizontal and a vertical movement, and a platen held on said carriage, of a locking mechanism, by which said carriage is held in the required vertical position, and an inked roller having circumferential ribs and being capable of being brought into contact with the paper on said platen, and a spring by which said roller is normally held out of contact with the paper, substantially as described.

13. The combination of a series of type-forms arranged to strike against a platen in a single horizontal plane, of a platen capable of both a horizontal and a vertical movement, and consisting of a bar, or plate, having a flat paper-supporting surface lying in a plane parallel with the line of the vertical movement of the platen, a graduated plate having a vertical movement corresponding with the vertical movement of said platen and a fixed gage mark, or line, corresponding with the horizontal plane of the printing and means for vertically moving said platen in order to bring the lines of a musical staff on the paper into the plane of the printing, substantially as described.

14. The combination with a paper-holding carriage, of a spacing mechanism by which said carriage is fed, a series of type-bar levers and actuating-keys, a rocking frame 33 arranged to be depressed by the downward movement of said keys and connecting mechanism by which said rocking frame and said spacing mechanism are connected or disconnected at will, substantially as described.

15. The combination of a type-bar pivoted at one end and carrying a type-form at its free end, said pivoted end having a cam-surface 22 and a prong 23 with a notch 24 inclosed between said prong and said cam-surface, a pivoted lever 26 having at one end a bent prong 25 arranged to bear against said cam-surface and enter said notch as the type-bar is rocked on its pivot, a vertically-sliding key 29 engaging said lever to depress the same and rock the type-bar and a spring by which said key is reversed, substantially as described.

16. The combination of a series of type-bars, type-bar-actuating mechanism, a rocking frame operatively connected with the type-bar-actuating mechanism, a carriage upon which the paper is held, a spacing mechanism, by which said carriage is given a feeding motion, and a button pivotally attached to said rocking frame, and adapted to be turned into engagement with said spacing mechanism, whereby said spacing mechanism and said type-bar-actuating mechanism are operatively connected, substantially as described.

17. The combination with a paper-holding carriage capable of a horizontal and a vertical movement, of a platen held on said carriage and consisting of a bar, or plate, having a flat paper-supporting surface lying in a plane parallel with the line of its vertical movement, a copy-holding frame mounted on said carriage and having a paper-supporting surface corresponding to the paper-supporting surface of said platen, means for holding the copy on said surface and an index-finger held by the frame of the machine and overlapping said copy-supporting surface, substantially as described.

Dated this 23d day of February, 1899.

FRANK C. WINN.

Witnesses:
RUFUS B. FOWLER,
HENRY W. FOWLER.